United States Patent [19]
Mizukami et al.

[11] Patent Number: 5,848,937
[45] Date of Patent: *Dec. 15, 1998

[54] DAMPER DISK ASSEMBLY HAVING INTEGRAL RETAINING PLATE CONNECTING MEANS

[75] Inventors: Hiroshi Mizukami, Neyagawa; Norihisa Uenohara, Ibaraki, both of Japan

[73] Assignee: Exedy Corporation, Neyagawa, Japan

[*] Notice: The term of this patent shall not extend beyond the expiration date of Pat. No. 5,697,846.

[21] Appl. No.: 777,871

[22] Filed: Dec. 31, 1996

[30] Foreign Application Priority Data

Jan. 11, 1996 [JP] Japan .................................. 8-021850

[51] Int. Cl.⁶ ...................................................... F16D 3/66
[52] U.S. Cl. ................................ 464/64; 192/212; 464/68
[58] Field of Search ................................ 464/64, 66, 67, 464/68; 192/213.31, 212, 213, 213.22; 74/574

[56] References Cited

U.S. PATENT DOCUMENTS

| | | | |
|---|---|---|---|
| 2,251,128 | 7/1941 | Goodwin | 192/212 |
| 4,570,775 | 2/1986 | Caray et al. | 464/64 X |
| 4,580,672 | 4/1986 | Caray | 464/64 X |
| 4,650,053 | 3/1987 | Kayanoki et al. | 192/213.21 |
| 5,634,543 | 6/1997 | Hashimoto et al. | 192/231.21 |
| 5,697,846 | 12/1997 | Uenohara | 464/64 |

FOREIGN PATENT DOCUMENTS

2411999 2/1977 France .

*Primary Examiner*—Eileen Dunn Lillis
*Attorney, Agent, or Firm*—Shinjyu An Intellectual Property Firm

[57] ABSTRACT

A clutch disk assembly includes axially opposed clutch and retaining plates 3 and 4. A flange having a plurality of circumferentially long recesses is arranged between clutch and retaining plates. A plate coupling portion 30 extends through a recess at the flange and connects the clutch and retaining plates 3 and 4 together.

15 Claims, 8 Drawing Sheets

DAMPER DISK ASSEMBLY HAVING INTEGRAL RETAINING PLATE CONNECTING MEANS

BACKGROUND OF THE INVENTION

A. Field of the Invention

The present invention relates to a damper disk assembly, and in particular to a damper disk assembly for use in a clutch disk assembly or the like where a retaining plate is formed with means for coupling to other members of the damper disk assembly.

B. Description of Related Art

A clutch disk assembly used in a clutch for an automotive vehicle typically includes a pair of input plates opposed to each other, an output hub formed with a radial flange, and coil springs disposed between the flange and the input plates for elastically coupling the paired input plates to the flange but allowing limited relative rotary displacement therebetween. The paired input plates are fixed together at their radially outer portions by a plurality of stop pins for integral rotation. The stop pins extend through recesses formed near the outer periphery of the flange, respectively. The input plates are rotatable relative to the flange through a predetermined angle. When the stop pins are brought into contact with edges of the recesses, the input plates stop its rotation relative to the flange.

The conventional clutch disk assembly described above uses the stop pins as members for restricting relative rotation between the input plates and the flange. Each stop pin requires a minimum diameter, and for structural strength must be located radially inside the outer periphery of the input plates. Due to the limiting conditions associated with the arrangement of the stop pins, the torsion angle within which relative rotation between the paired input plates and the flange occurs cannot be easily increased. This means that, even if hard coil springs are used, the capacity or properties of the coil springs cannot be fully utilized, because the relative torsion angle cannot be increased sufficiently.

SUMMARY OF THE INVENTION

An object of the invention is to provide a damper disk assembly with a construction which overcomes the disadvantages associated with the necessary configuration of stop pins in the prior art, and to provide the damper disk assembly with a sufficient increase in a relative torsion angle between an input member and an output member, as compared with the prior art.

A damper disk assembly of in accordance with one aspect of the present invention includes a pair of first circular plates, a second circular plate, an elastic member and a plurality of plate coupling portions. The paired first circular plates are axially opposed to each other. The second circular plate is arranged between the paired first circular plates for rotation relative to the same, and has a plurality of circumferential recesses. The elastic member is adapted to be compressed in response to relative rotation between the paired first circular plates and the second circular plate. The plurality of plate coupling portions extend through recesses at the second circular plate, and couple the paired first circular plates together.

When the paired first circular plates rotate, the torque thereof is transmitted to the second circular plate via the elastic member. When the paired first circular plates receive a torsional vibration, the first circular plates rotate relatively to the second circular plate with the elastic member therebetween. When the torsion angle between the first and second circular plates increases, the plurality of plate coupling portions are brought into contact with edges of the recesses formed at the second circular plate, so that the first circular plates stop its rotation relative to the second circular plate. In this structure, conventional stop pins are eliminated, and the plurality of plate coupling portions are employed for coupling the paired first circular plates together and restricting relative torsion between the first and second circular plates. The plate coupling portion can have a circumferential width smaller than that of a stop pin, so that the maximum relative torsion angle can be larger than that in the prior art.

Preferably, in the damper disk assembly, each of the plate coupling portions has an extension extending from one of the paired first circular plates, and a claw formed by bending the extension and fixed to the other of the paired first circular plates.

Preferably, in the damper disk assembly, the plurality of plate coupling portions are formed by bent portions at the outer periphery of the one of the paired first circular plates.

Preferably, in the damper disk assembly, the plurality of plate coupling portions are formed of partially cut and bent portions of one of the paired first circular plates.

Preferably, in the damper disk assembly, the other of the paired first circular plates is provided with apertures, and the claws are provided with projections caulked in the apertures, respectively.

Preferably, in the damper disk assembly, the other of the first circular plates is provided with concavities, and the claws are provided with projections inserted into and welded to the concavities, respectively.

A damper disk assembly of another aspect of the invention includes a pair of first rotary circular plates, a second rotary circular plate, a third rotary circular plate, a first elastic member, a second elastic member and a plate coupling portion. The paired first rotary circular plates are axially opposed to each other. The second rotary circular plate is arranged between the paired first rotary circular plates. The third rotary circular plate is adjacent to the second rotary circular plate and has a circumferentially long recess. The first elastic member is adapted to be circumferentially compressed by relative rotation between the first and second rotary circular plates. The second elastic member is adapted to be circumferentially compressed by relative rotation between the second and third rotary circular plates. The plate coupling portion extends through the recess in the third rotary circular plate, and couples the paired first rotary circular plates together. When the relative torsion angle between the first and third rotary circular plates is small, the first and second elastic members act in series. When this relative torsion angle is large, the first rotary circular plate is in contact with and compresses the second elastic member. This damper disk assembly exhibits low-rigidity characteristics in a range of a small torsion angle between the first and third rotary circular plates rotated relatively to each other, because the first and second elastic members are compressed in series. When the torsion angle increases, the first rotary circular plates compress the second elastic member, so that only the second elastic member or both the elastic members are compressed, which provides high-rigidity characteristics. When the torsion angle further increases, the plate coupling portions are brought into contact with the edges of the recesses formed at the third rotary circular plate, so that the paired first rotary circular plates and the third rotary circular plate stop the relative rotation. In this structure, conventional stop pins are eliminated, and the plate coupling portions are employed for coupling the paired first rotary circular plates together and restricting relative torsion between the first and third rotary circular plates. The plate coupling portion can have a circumferential smaller width than a stop pin, so that the maximum relative torsion angle can be larger than that in the prior art.

In another aspect of the present invention, a damper disk assembly includes a pair of first annular plates axially opposed to each other and a second annular plate arranged between the first annular plates, the second annular plate configured for limited relative rotary displacement with respect to the first annular plates. The second annular plate is formed with at least one circumferentially extending recess on an outer circumferential portion thereof. An elastic member is disposed between the first annular plate. The elastic member is compressible in response to relative rotary displacement between the first annular plates and the second annular plate. At least one plate coupling portion extends through the recess connecting the first annular plates together and providing a stop limit to relative rotary displacement between the first annular plates and the second annular plate.

Preferably, the plate coupling portion includes an extension homogeneously formed with one of the paired first annular plates and axially extending from a radially outer portion thereof, and a claw formed on the extension, the claw extending radially inwardly, the claw being fixed to the other of the first annular plates.

Preferably, the claw is fixed to the other of the first annular plates by a rivet which extends through the Preferably, the claw is formed with a projection which extends through an aperture formed in the other of the first annular plates.

Preferably, the damper disk assembly further includes a cushion plate having a plurality of friction surfaces fixed thereto, the cushion plate being fixed to the claw and the other of the first annular plates.

Preferably, the plate coupling portion may alternatively include an extension homogeneously formed with one of the first annular plates and axially extends from a radial mid portion thereof, and a claw is formed on the extension, the claw extending radially inwardly, the claw being fixed to the other of the first annular plates.

Preferably, the one of the first annular plates further includes a radial outward portion having friction surface members attached thereto radially outward from the extension.

Preferably, the damper disk assembly further includes first and second friction plates, the first friction plate disposed between one of the first annular plates and the second annular plate, the second friction plate disposed between the other of the first annular plates and the second annular plate, the first and second friction plates for generating friction in response to relative rotation between the first annular plates and the second annular plate.

Preferably, the damper disk assembly may alternatively include a hub disposed radially inward from the second annular plate, the hub and the second annular plate being configured for limited rotary displacement with respect to one another.

Preferably, the damper disk assembly further includes first, second and third friction plates, the first friction plate disposed between one of the first annular plates and the second annular plate, the second friction plate disposed between the other of the first annular plates and the second annular plate, and the third friction plate disposed between the other of the first annular plates and the hub, the first and second friction plates for generating friction in response to relative rotation between the first annular plates and the second annular plate, and the third friction plate for generating friction in response to relative rotation between the first annular plates and the hub.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
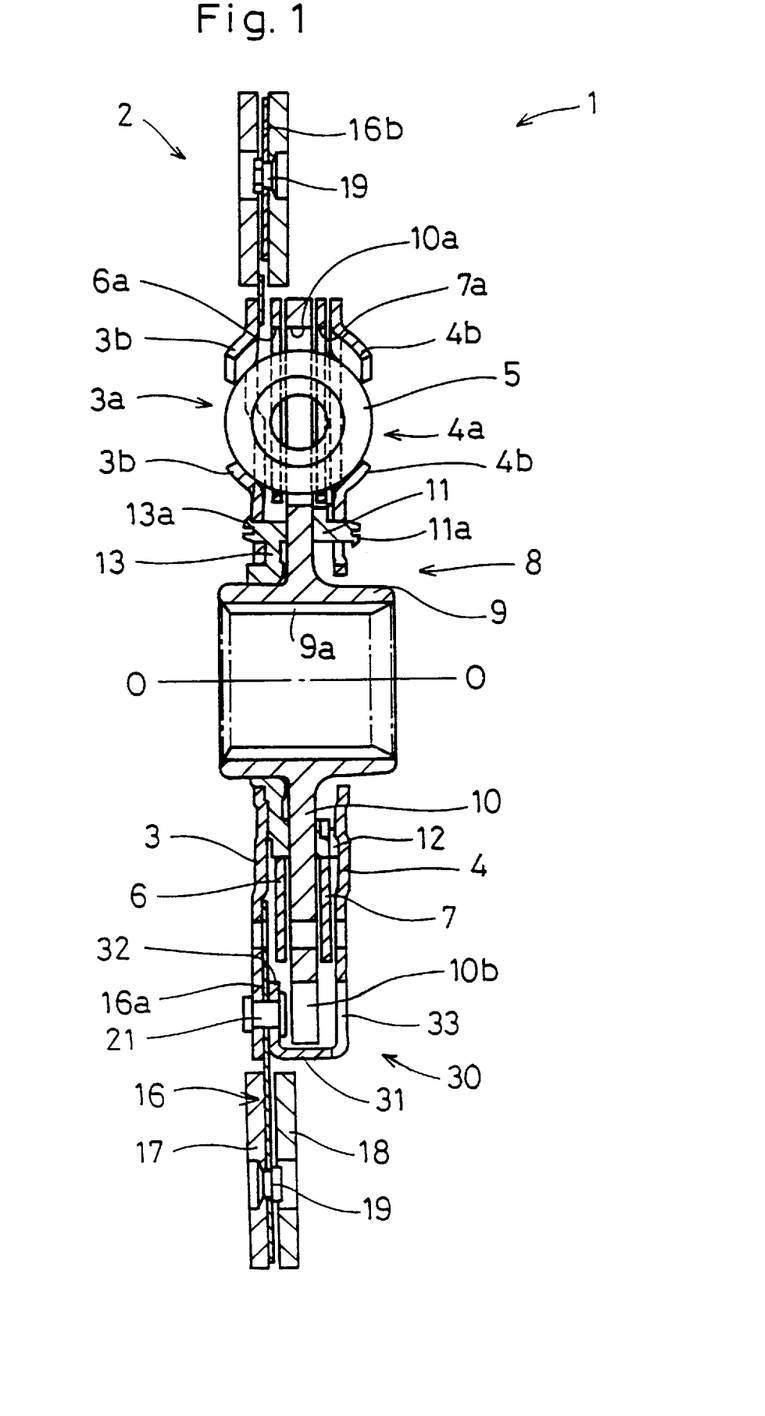
FIG. 1 is a cross sectional side view of a clutch disk assembly in accordance with a first embodiment of the present invention taken along the line I—I in FIG. 2.
Figure 2:
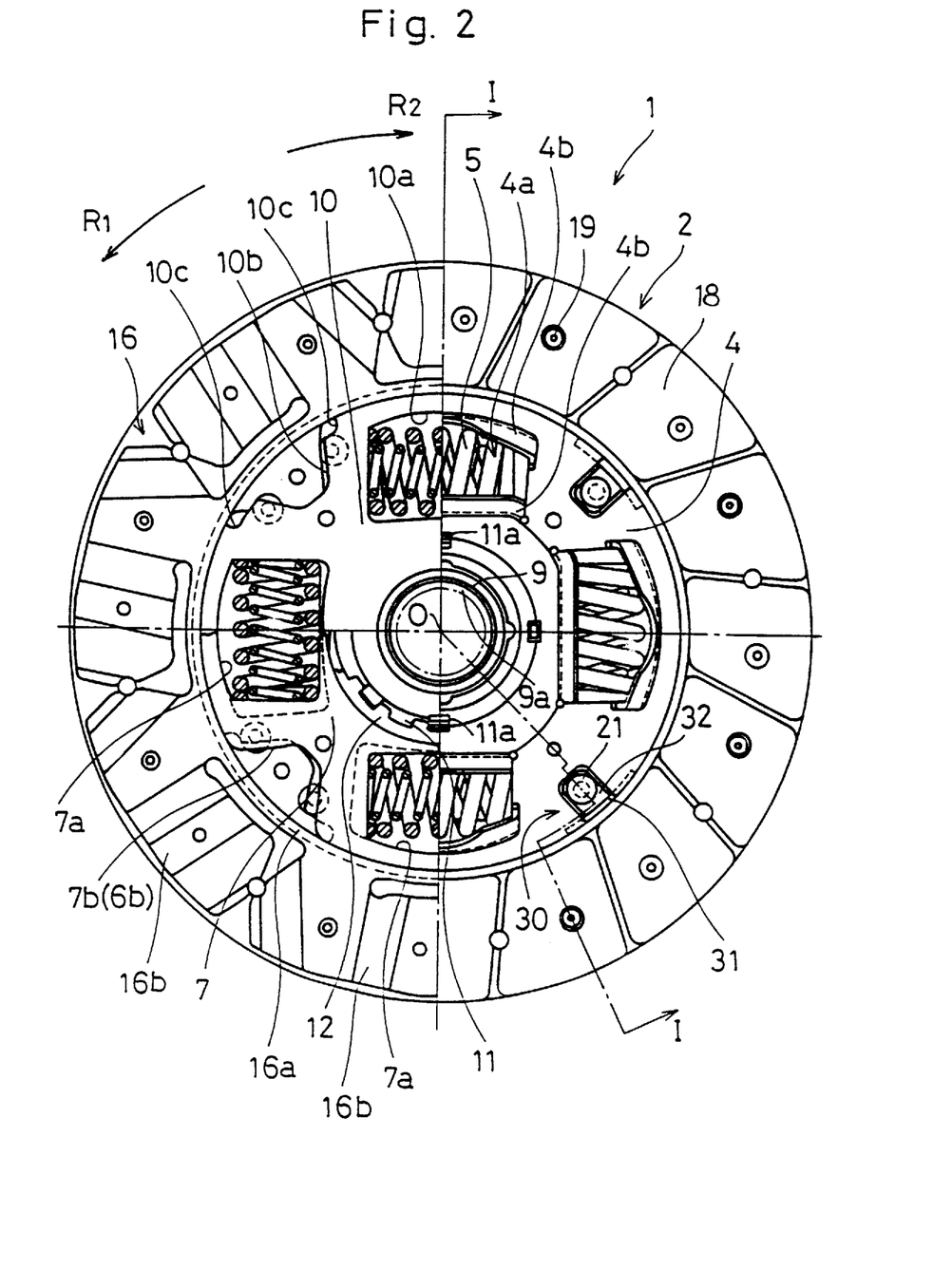
FIG. 2 is a partial cutaway, part cross section and part elevational view of the clutch disk assembly shown in FIG. 1.

A clutch disk assembly 1 shown in FIGS. 1 and 2 is provided for selectively transmitting torque from a flywheel (not shown) of an engine to a transmission (not shown). In FIG. 1, line 0—0 represents a rotation axis of the clutch disk assembly 1. When installed in an automotive vehicle, the clutch disk assembly 1 is configured for installation with the engine (not shown) positioned to the left side of FIG. 1 and the transmission (not shown) positioned to the right side of FIG. 1. For convenience, henceforth the left side of FIG. 1 will be referred to as the engine side and the right side of FIG. 1 will be referred to as the transmission side.

The clutch disk assembly 1 includes, as major components, a frictional coupling portion 2, input plates which are specifically a clutch plate 3 and a retaining plate 4, coil springs 5, first and second intermediate plates 6 and 7, and a spline hub 8.

The frictional coupling portion 2 is adapted to be pressed against the flywheel (not shown). The frictional coupling portion 2 includes a cushioning plate 16, and first and second friction facings 17 and 18. The cushioning plate 16 is formed with an annular portion 16a and a plurality of cushioning portions 16b which are formed at the outer periphery of the annular portion 16a and are arranged in the circumferential direction. The annular portion 16a is fixed to the clutch and retaining plates 3 and 4 by four fixing rivets 21, as will be described in greater detail below. The first friction facing 17 at the engine side and the second friction facing 18 at the transmission side are fixed to the opposite surfaces of the cushioning portions 16b of the cushioning plate 16 by rivets 19, respectively.

Figure 3:
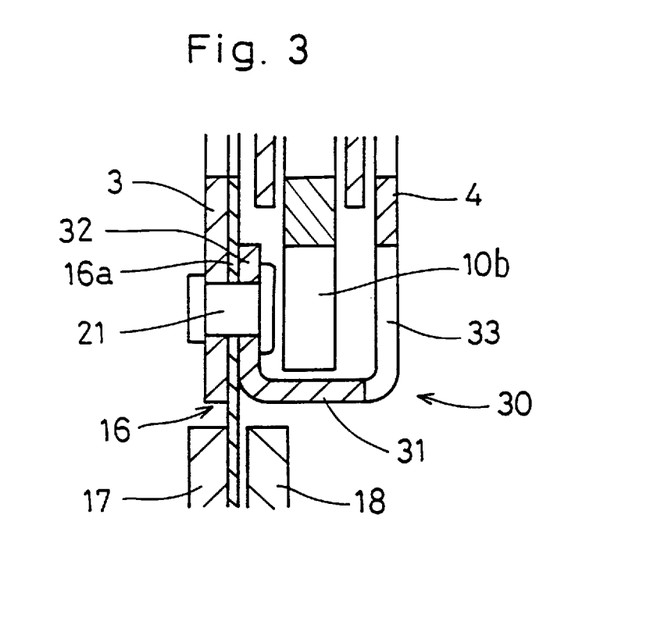
FIG. 3 is a fragmentary, cross sectional view of a portion of the clutch disk assembly depicted in FIG. 1, on a slightly enlarged scale.
Figure 4:
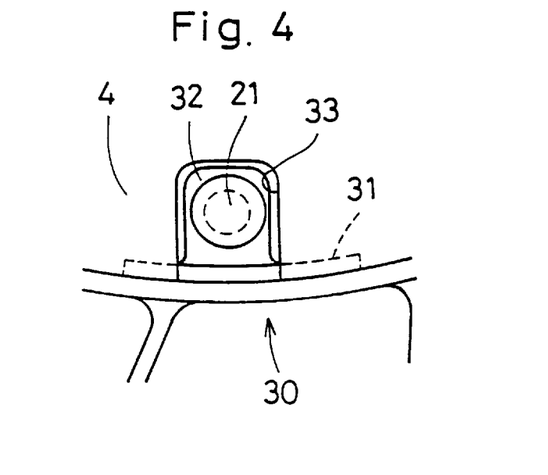
FIG. 4 is a fragmentary, elevational view of a portion of the clutch disk assembly depicted in FIGS. 1 and 2, on a slightly enlarged scale.
Figure 5:
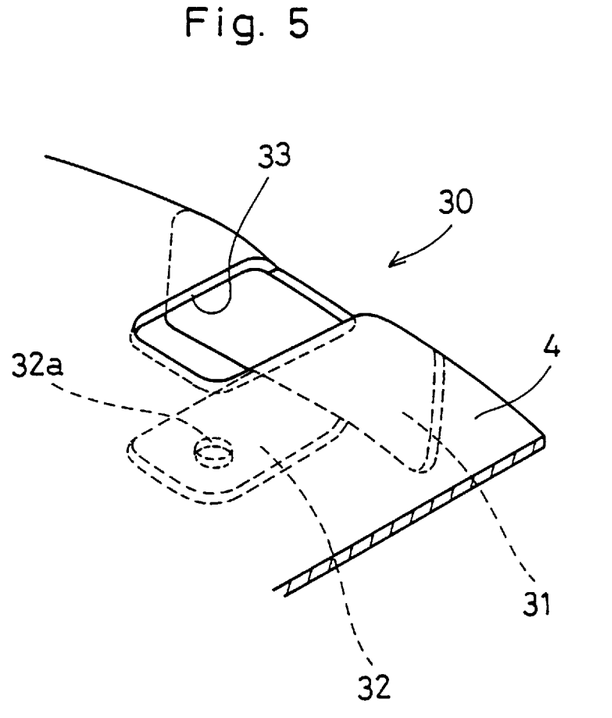
FIG. 5 is a perspective view of a portion of the clutch disk assembly depicted in FIGS. 1 and 2, showing a plate coupling portion of the clutch disk assembly.

The clutch and retaining plates 3 and 4 are annular plate members, and are axially spaced from each other by a predetermined distance. The retaining plate 4 is provided at its outer periphery with four plate coupling portions 30 which are generally equally circumferentially spaced from each other, as shown in FIGS. 3 to 5. Each plate coupling portion 30 is generally formed with an extension 31 and a claw or tongue 32. Each extension 31 is formed unitarily with the retaining plate 4 as a single element, the extension 31 being bent at an outer periphery of the retaining plate 4 toward the clutch plate 3. The extension 31 has a predetermined circumferential width. The claw 32 extends radially inwardly from the extension 31, being bent radially inward from the extension 31. The claw 32 is in contact with the annular portion 16a of the cushioning plate 16. The claw 32 is provided with an aperture 32a into which the fixing rivet 21 is inserted. The claw 32 has a smaller circumferential width than the extension 31. Each of the fixing rivets 21 extend through a corresponding aperture formed in the clutch plate 3, a corresponding aperture formed in the annular portion 16a of the cushioning plate 16 and one aperture 32a thus fixing the clutch plate 3, cushioning plate 16 and the claws 32 of the retaining plate 4 together.

The retaining plate 4 is provided with caulking apertures 33 at positions corresponding to the claws 32 to allow for insertion and deformation of the rivets 21 during assembly, as is described in greater detail below.

Each of the clutch and retaining plates 3 and plate 4 is provided at its radially outer portion with circumferentially equally spaced four openings or windows 3a or 4a. Each of the windows 3a and 4a is provided at its radially inner and outer edges with cut and bent portions 3b or 4b.

The spline hub 8 is arranged coaxially with the plates 3 and 4. The spline hub 8 includes an axially extending cylindrical boss 9 and a radial flange 10 extending integrally from the boss 9. The boss 9 is provided at its inner periphery with a spline aperture 9a fitted to a shaft (not shown) which extends from the transmission (not shown). The flange 10 has openings or windows 10a at positions corresponding to the windows 3a and 4a. The flange 10 is also provided at its outer periphery with four recesses 10b corresponding to the plate coupling portions 30. The flange 10 also has circumferentially extending contact concavities 10c which are located at circumferentially opposite portions of each recess 10b. The above described configuration is such that, compared to the prior art, allows for an increase in the maximum value of the relative rotation angle of the plates 3 and 4 with respect to the flange 10.

The first intermediate plate 6 is arranged between the clutch plate 3 and the flange 10. The second intermediate plate 7 is arranged between the flange 10 and the retaining plate 4. These plates 6 and 7 have outer diameters generally equal to those of the clutch and retaining plates 3 and 4, but have inner diameters larger than the inner diameter of the plates 3 and 4, as can be seen in FIG. 1. The first and second intermediate plates 6 and 7 have openings 6a and 7a at positions corresponding to the openings 3a, 4a and 10a, respectively. The openings 6a and 7a are circumferentially shorter than the openings 3a, 4a and 10a.

The coil springs 5 are arranged in the windows 3a, 4a, 6a, 7a and 10a. As can be seen from the figure, each coil spring 5 is actually defined by two coaxially arranged springs, one large coil spring and small coil springs. Each pair of coaxial coil springs will herein after be referred to as the coil spring 5 for simplicity. Circumferentially opposite ends of each coil spring 5 are in contact with the edges of the windows 3a and 4a and the edges of the windows 6a and 7a.

In FIG. 2, the four coil springs 5 are shown, one in a lower position, one on the engine side or left side, one in an upper position and one on the transmission or right side. The configuration of the coil springs 5 on the left and lower sides will now be described. It should be appreciated that the coil springs 5 in the upper and right sides are configured generally the same as the coil springs 5 in the lower and left sides. The left coil spring 5 is arranged such that the end at the R2 side, i.e., the end forming the forward end in the direction R2, is in contact with the edges of the windows 3a, 4a and 10a, and the end at the R1 side, i.e., the end forming the forward end in the direction R1, is spaced by a predetermined distance from the edges of the windows 3a, 4a and 10a. The lower coil spring 5 is arranged such that the end at the R1 side is in contact with the edges of the windows 3a, 4a and 10a, and the end at the R2 side is spaced by a predetermined distance from the edge of the windows 3a, 4a and 10a. Thus, the end of the coil spring 5 in the left position adjacent to the coil spring 5 in the lower position is spaced from the edges of the windows 3a, 4a and 10a. Opposite ends of each coil spring 5 are in contact with the edges of the windows 6a and 7a of the first and second intermediate plates 6 and 7. In this manner, the left and lower coil springs 5 are arranged in series to couple the plates 3 and 4 to the flange 10 via the intermediate plates 6 and 7. The other set of the two coil springs 5 at the upper and right positions in FIG. 2 are arranged similarly to the above.

A first friction washer 11 is arranged between radially inner portions of the flange 10 and the retaining plate 4. The first friction washer 11 has an annular or circular potion which is in contact with the surface of the flange 10 facing the transmission side. The first friction washer 11 has engagement projections 11a for snap-fit. The engagement projections 11a are axially movable with respect to the first friction washer 11 but are engaged with apertures formed at a radially inner portion of the retaining plate 4 such that the first friction washer 11 cannot rotate with respect to the retaining plate 4. A conical spring 12 is arranged between the circular portion of the first friction washer 11 and the retaining plate 4. The conical spring 12 thus arranged is axially compressed so that it axially biases the first friction washer 11 and the retaining plate 4 away from each other.

The second friction washer 13 is arranged between the radially inner portions of the clutch plate 3 and the flange 10. The second washer 13 is in contact with the flange 10 and the outer periphery of the boss 9. The second friction washer 13 has axially projected engagement projections 13a for snap-fit, which are axially movably with respect to the clutch plate 3 but are engaged in apertures formed at the radially inner portion of the clutch plate 3 such that the second friction washer 13 cannot rotate with respect to the clutch plate 3.

Operation of the clutch disk assembly 1 will be described below.

When the friction coupling portion 2 is coupled to the flywheel (not shown), a torque is transmitted from the flywheel to the spline hub 8 via the friction coupling portion 2, clutch and retaining plates 3 and 4, coil springs 5, first and second intermediate plates 6 and 7, and coil springs 5. The torque is further transmitted from the spline hub 8 to the shaft (not shown) extending from the transmission (not shown).

When a torsional vibration due to, e.g., variation in combustion of the engine is transmitted to the clutch disk assembly 1, the respective plates perform periodical relative rotation, so that the coil springs 5 are compressed, and the first and second friction washers 11 and 13 slide on the flange 10 to generate a hysteresis torque by producing friction.

Torsion characteristics will be described below. In the following description, it is assumed that the spline hub 8 is fixed to an appropriate stationary member, and the clutch and retaining plates 3 and 4 are rotated relatively to the spline hub 8. With respect to the operation of the coil springs 5, the following description will be given only on one set of the left and lower coil springs 5.

In FIG. 2, the plates 3 and 4 are shown in a torsion free state. When the plates 3 and 4 are rotated in the direction R1 from the torsion free state, the edges of the windows 3a and 4a in the plates 3 and 4 push the left coil spring 5, which in turn pushes the lower coil spring 5 via the intermediate plates 6 and 7. The left coil spring 5 is compressed between the plates 3 and 4 and the intermediate plates 6 and 7. The lower coil spring 5 is compressed between the intermediate plates 6 and 7 and the flange 10. Thus, the left and lower coil springs 5 act in series. Simultaneously, the right and upper coil springs 5 act in series in a similar manner. This results in low-rigidity characteristics.

When the torsion angle increases, the end at the R1 side of the left coil spring 5 is brought into contact with the edge of the left window 10a in the flange 10, and the edges of the lower windows 3a and 4a are brought into contact with the end at the R2 side of the lower coil spring 5. Consequently, both the coil springs 5 are compressed in parallel between the edges of the windows 3a and 4a in the clutch and retaining plates 3 and 4 and the edge of the window 10a in the flange 10. This provides high-rigidity characteristics. During this operation, the first and second intermediate plates 6 and 7 do not make relative rotation.

When the torsion angle further increases to a predetermined amount, the extensions 31 of the plate coupling portions 30 are brought into contact with the contact concavities 10c of the recesses 10b formed at the flange 10. This stops relative rotation of the clutch and retaining plates 3 and 4 with respect to the spline hub 8.

The first embodiment described above and shown in FIGS. 1 through 5 does not employ conventional stop pins. Rather, present invention provides a structure in which the plate coupling portions 30 couple the clutch and retaining plates 3 and 4 together and restrict relative rotation of the plates 3 and 4 with respect to the flange 10. Therefore, the maximum relative torsion angle can be larger than that in the prior art where stop pins are employed. In particular, the extension 31 can be circumferentially shorter than the conventional stop pin, which can further increase the maximum relative torsion angle.

An assembly operation of the clutch disk assembly 1 will be described below. First, the spline hub 9, cushioning plate 16, first and second intermediate plates 6 and 7 and others are arranged on the clutch plate 3, and the retaining plate 4 is arranged with respect to them on the clutch plate 3. In this operation, the apertures 32a in the claws 32 of the retaining plate 4 are aligned to the apertures in the clutch plate 3 and the retaining plate 16. In this state, the fixing rivets 21 are inserted into the connection apertures from the clutch plate side. Dies for rivet caulking are inserted into caulking apertures 33 formed at the retaining plate 4 and the recesses 10b at the flange 10, and heads of the fixing rivets 21 are deformed. In this manner, the clutch and retaining plates 3 and 4 are coupled together, and the cushioning plate 16 is fixed to the radially outer portion of the plates 3 and 4.

The plate coupling portion described above is formed with an extension and claw extend integrally from the clutch plate. Alternatively, the plate coupling portion may be made of a separate member, independent of the clutch and retaining plates.

Second Embodiment

In the first embodiment described above, the boss of the spline hub is integral with the flange. In contrast to the first embodiment, a second embodiment is also within the scope of the present invention. The second embodiment has virtually all of the elements of the first embodiment above except that a spline hub is formed as a separate member from a flange. Further, an elastic member arrange between the spline hub and the flange. This structure further increases the maximum value of the total torsion displacement angle, and can provide lower-rigidity characteristics at the first stage in the relative rotation operation. Below, only the structure and operation of the second embodiment which differs from the first embodiment will be described below, and similar structure and operation will not be described below.

Figure 6:
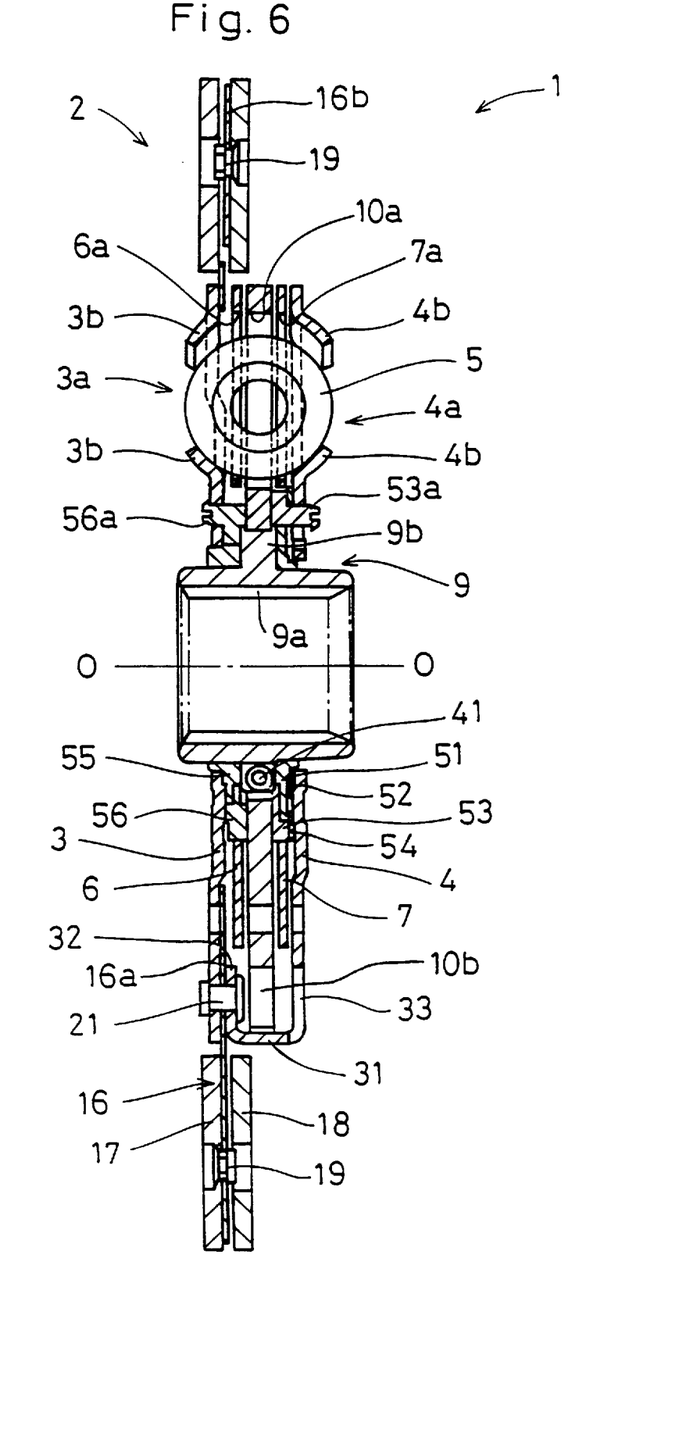
FIG. 6 is a cross sectional side view similar to FIG. 1, showing a clutch disk assembly in accordance with a second embodiment of the present invention taken along the line VI—VI in FIG. 7.
Figure 7:
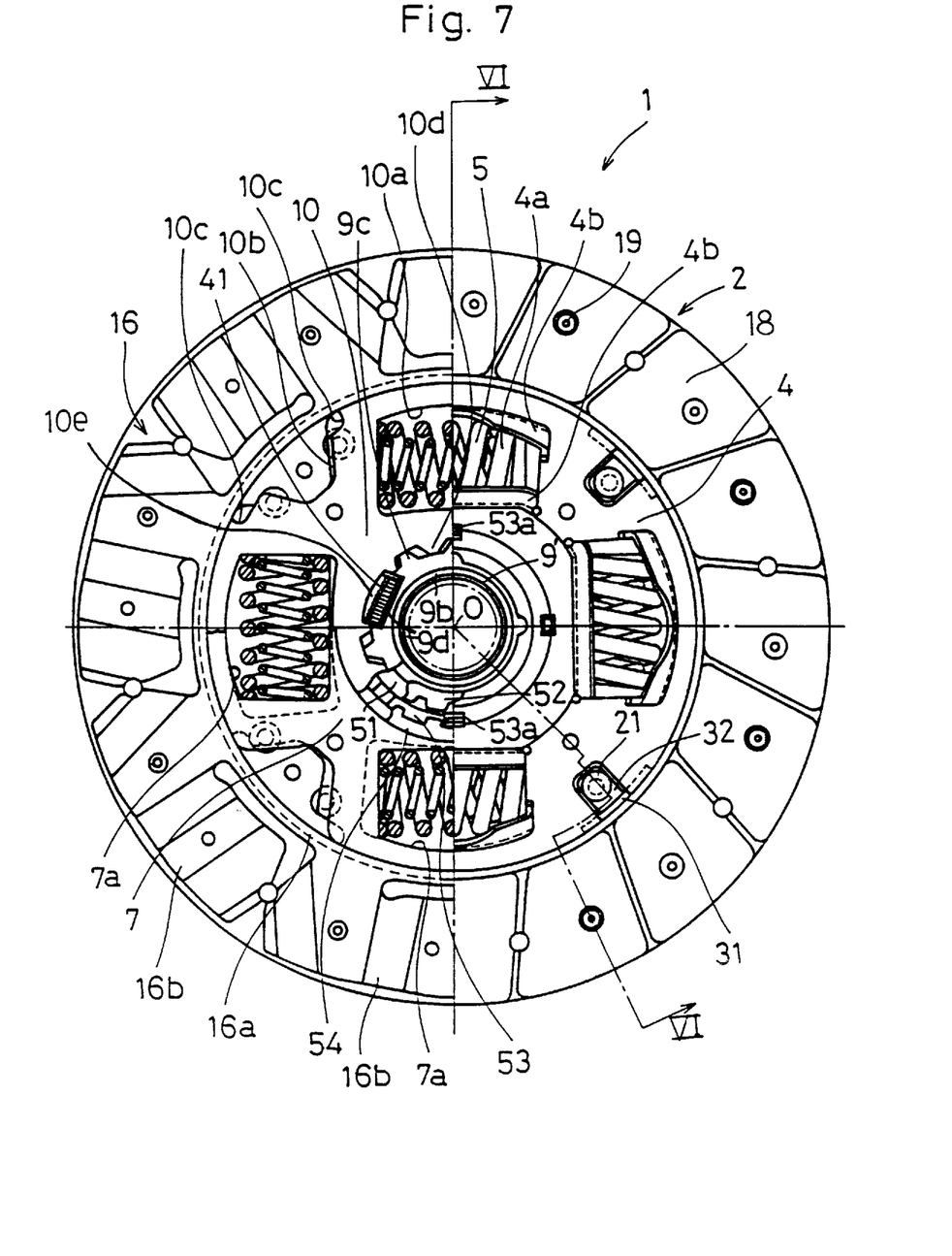
FIG. 7 is a plan of the clutch disk assembly of the second embodiment.

The boss 9' is an axially extending cylindrical member, and has a spline aperture 9a fitted to the shaft extending from the unillustrated transmission. The boss 9' is integrally provided at its outer periphery with a flange 9b. The flange 9b has a plurality of outer teeth 9c projected radially outward. The separate flange 10 is provided at its inner periphery with a plurality of inner teeth 10d, each of which is located between the adjacent outer teeth 9c. A circumferential space is defined between the teeth 10d and 9c neighboring to each other. The flange 9b is provided with a circumferentially long recess 9d, and a recess 10e is formed at the position in the separate flange 10 corresponding to the recess 9d. A small coil spring 41 is arranged in the recesses 9d and 10e.

A first friction washer 51 and a first conical spring 52 are arranged between the flange 9b and a radially inner portion of the retaining plate 4. The first friction washer 51 is in contact with the flange 9b, and the first conical spring 52 is axially compressed between the first friction washer 51 and the retaining plate 4.

A second friction washer 53 and a second conical spring 54 are arranged between the separate flange 10 and the retaining plate 4. The second friction washer 53 is in contact with the separate flange 10, and the second conical spring 54 is axially compressed between the second friction washer 53 and the retaining plate 4. The second friction washer 53 has a plurality of engagement projections 53a for snap-fit projected toward the transmission. The engagement projections 53a are axially movable with respect to the retaining plate 4 but due to engagement with apertures formed at the radially inner portion of the retaining plate 4, the second friction washer 53 cannot rotate with respect to the retaining plate 4.

Similarly, the first friction washer 51 is axially movable but is engaged with the second friction washer 53 so that the first and second friction washers 51 and 53 rotate together with the retaining plate 4.

A third friction washer 55 is arranged between the flange 9b and the radially inner portion of the clutch plate 3. A fourth friction washer 56 is arranged between radially inner portions of the separate flange 10 and the clutch plate 3. The third friction washer 55 is in contact with the flange 9b, and is engaged with the clutch plate 3 such that it may not rotate with respect thereto. The fourth friction washer 56 is in contact with the separate flange 10 and the clutch plate 3. The fourth friction washer 56 is provided with a plurality of engagement projections 56a projected toward the engine. The engagement projections 56a are axially movably but are engaged with the clutch plate 3 such that the fourth friction washer 56 may not rotate with respect to the clutch plate 3. The third and fourth friction washers 55 and 56 are engaged with each other such that they may not rotate with respect to one another.

In this embodiment, only the small coil spring 41 having the lowest rigidity is compressed when the torsion angle is small. In this operation, only the first and second friction washers 51 and 53 frictionally slide on the flange 9b, so that a low hysteresis torque is generated.

Third Embodiment

Figure 8:
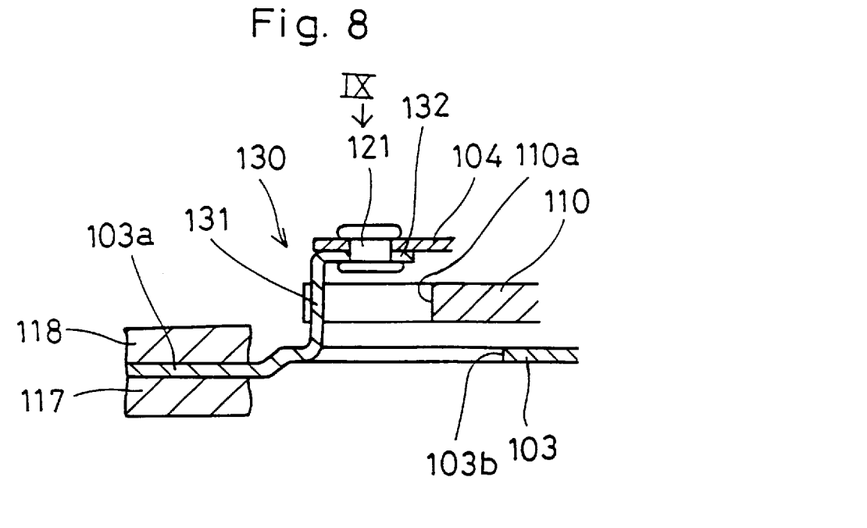
FIG. 8 is a fragmentary, cross sectional view of a portion of a clutch disk assembly, showing a plate coupling portion of a clutch disk assembly in accordance with a third embodiment of the present invention.
Figure 9:
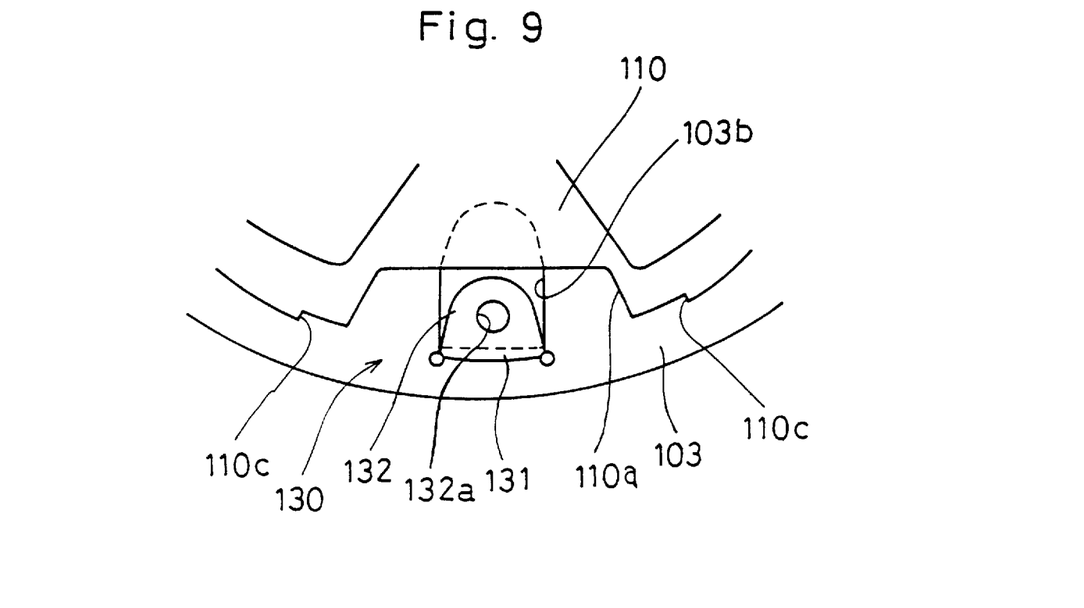
FIG. 9 is a fragmentary, elevational view of the clutch disk assembly depicted in FIG. 8, looking in the direction of arrow IX in FIG. 8, with portions of the clutch disk assembly removed for clarity.

In a clutch disk assembly in accordance with a third embodiment, shown in FIGS. 8 and 9, a clutch plate 103 has a radially outer portion 103a which support first and second ceramic metal facings 117 and 118 fixed thereto. The facings 117 and 118 are configured for engagement with a flywheel (not shown) and a pressure plate (not shown). At positions radially inside the radially outer portion 103a, there are arranged plate coupling portions 130 which are circumferentially equally spaced from each other. Each plate coupling portion 130 is formed of an extension 131, which is a cut and bent portion of the clutch plate 103, and a claw 132. The claw 132 is formed with a hole 132a. The extension 131 extends through a recess 110a at the flange 110 toward the retaining plate 104. The claw 132 is bent radially inward from the extension 131, and is fixed to the outer peripheral portion of the retaining plate 104 by a rivet 121 which extends through the hole 132a. A recessed aperture 103b, which is produced by formation of the plate coupling portion 130, is utilized as an aperture for inserting a caulking die used for caulking the rivet 121. The plate coupling portions 130 can provide the same effect as those in the first embodiment, where the plate coupling portions 130 may engage contact concavities similar to contact concavities 110c described above with respect to the first embodiment, to limit rotation between the flange 110 and the plates 103 and 104.

It should be appreciated that the rivet 121 and the plate 104 have been removed in FIG. 9 to provide greater clarity.

Fourth Embodiment

Figure 10:
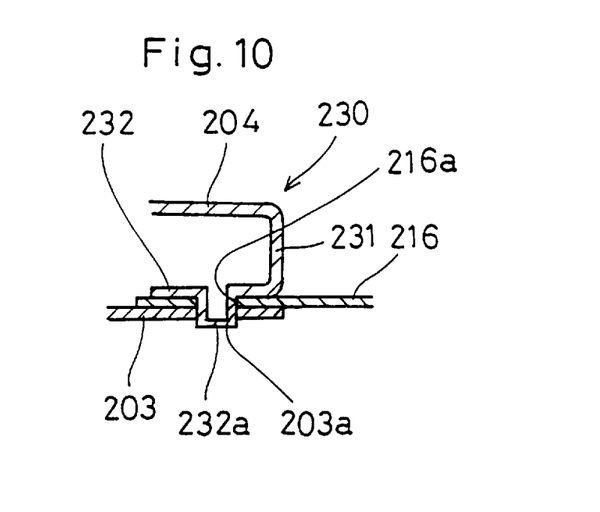
FIG. 10 is a fragmentary, cross section of a portion of a clutch disk assembly, showing a plate coupling portion in accordance with a fourth embodiment of the present invention.

The plate coupling portions may be fixed by means other than the rivets. In a clutch disk assembly shown in FIG. 10, a clutch plate 203 is provided at its outer peripheral portion with a plurality of circumferentially equally spaced apertures 203a. A retaining plate 204 has plate coupling portions 230 at positions corresponding to the apertures 203a. Each plate coupling portion 230 is formed of an extension 231 and a claw 232 which is bent radially inward at the tip end of the extension 231. The claw 232 has a projection 232a formed by press working. The projection 232a is caulked in the aperture 203a in the clutch plate 203 and an aperture 216a in a cushioning plate 216. Since this structure does not use a rivet, the cost can be further reduced.

Fifth Embodiment

Figure 11:
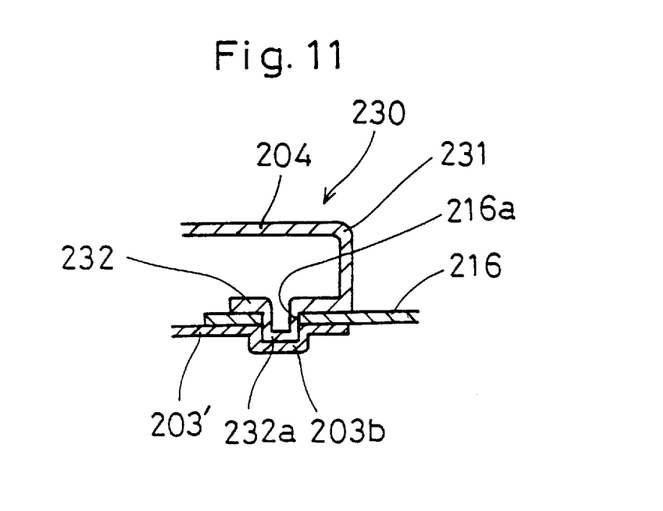
FIG. 11 is a fragmentary, cross section of a portion of a clutch disk assembly, showing a plate coupling portion in accordance with a fifth embodiment of the present invention.

In a clutch disk assembly shown in FIG. 11, the clutch plate 203' has a plurality of circumferentially equally spaced concavities 203b which are formed by press working. The retaining plate 204 has plate coupling portions 230 at positions corresponding to the concavities 203b. Each plate coupling portion 230 is formed of an extension 231 and a claw 232 bent radially inward from the end of the extension 231. The claw 232 has a projection 232a formed by press working. The projection 232a is inserted into the concavity 203b through the aperture 216a in the cushioning plate 216. The projection 232a at the retaining plate 204 is welded to the edge of the concavity 203b at the clutch plate 203'. This embodiment eliminates a rivet and thus can reduce a cost similarly to the above embodiment.

According to the damper disk assembly of the invention, a conventional stop pin is eliminated, and the plurality of plate coupling portions are employed for coupling the paired first circular plates together and restricting relative rotation between the first and second circular plates. Since the plate coupling portion can have a smaller circumferential width than a stop pin, the maximum relative torsion angle can be larger than that in the prior art.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed:

1. A damper disk assembly comprising:

a pair of first circular plates axially opposed to each other;

a second circular plate disposed between said paired first circular plates, said second circular plate being configured for limited relative rotation with respect to said pair of said first circular plates, and said second circular plate being formed on an outer circumferential portion with a plurality of circumferentially extending recesses;

an elastic member being adapted to be compressed in response to relative rotation between said paired first circular plates and said second circular plate;

a first of said paired first circular plates being formed with a plurality of plate coupling portions formed homogeneously with said first of said paired first circular plates, each of said plate coupling portions extending in a generally axial direction from an outer circumferential edge of said first of said paired first circular plates, each of said plate coupling portions extending through a corresponding one of said recesses formed in said second circular plate, each of said plate coupling portions further formed with a radially inwardly extending portion, said radially inwardly extending portion being connected to a second of said paired first circular plates; and wherein said plate coupling portions are configured to engage circumferential ends of said recesses in response to relative rotation between said second circular plate and said paired first circular plates thus limiting relative rotation therebetween.

2. The damper disk assembly according to claim 1, wherein said first of said paired first circular plates is formed with a plurality of apertures proximate said outer circumferential edge of said first of said paired first circular plates, said apertures being generally aligned with and corresponding to said plate coupling portions on said first of said paired first circular plates and further corresponding to apertures formed on said second of said paired first circular plates.

3. The damper disk assembly according to claim 1, wherein each of said recesses formed in said second circular plate have a circumferential length of greater than 25°.

4. The damper disk assembly according to claim 1 wherein
said plate coupling portions are formed from a cut and bent portion of said first of said paired first circular plates.

5. The damper disk assembly according to claim 1, wherein
said second of said first circular plates is provided with apertures, and said radially inwardly extending portion of said plate coupling portions are provided with projections caulked in said apertures, respectively.

6. The damper disk assembly according to claim 1, wherein
said second of said paired first circular plates is provided with concavities, and said said radially inwardly extending portion of said plate coupling portions are provided with projections inserted into and welded to said concavities, respectively.

7. A damper disk assembly comprising:
a pair of first rotary circular plates axially opposed to each other;
a second rotary circular plate arranged between said paired first rotary circular plates;
a third rotary circular plate being adjacent to said second rotary circular plate and having a circumferentially long recess;
a first elastic member adapted to be circumferentially compressed by relative rotation between said first and third rotary circular plates;
a second elastic member adapted to be circumferentially compressed by relative rotation between said second and third rotary circular plates; and
a plate coupling portion extending through said recess in said third rotary circular plate, said plate coupling portion being formed homogeneously with one of said paired first rotary circular plates, said plate coupling portion including an axially extending portion extending through said recess, a circumferential length of said axially extending portion being shorter than a corresponding circumferential length of said recess, said plate coupling portion further including a radially inwardly extending portion which connects to the other of said paired first rotary circular plates coupling said paired first rotary circular plates together, wherein
when the relative torsion angle between said first and third rotary circular plates is small, said first and second elastic members act in series, and when said relative torsion angle is large, said first rotary circular plate is in contact with and compresses said second elastic member, and wherein said plate coupling portions are configured to engage circumferential ends of said recesses in response to relative rotation between said second circular plate and said paired first circular plates thus limiting relative rotation therebetween.

8. A damper disk assembly comprising:
a pair of first annular plates axially opposed to each other;
a second annular plate arranged between said first annular plates, said second annular plate configured for limited relative rotary displacement with respect to said first annular plates, said second annular plate being formed with at least one circumferentially extending recess on an outer circumferential portion thereof;
an elastic member disposed between said first annular plates, said elastic member being compressible in response to relative rotary displacement between said first annular plates and said second annular plate; and
at least one plate coupling portion extending through said recess connecting said first annular plates together and providing a stop limit to relative rotary displacement between said first annular plates and said second annular plate, said plate coupling portion being formed homogeneously with one of said first circular plates, said plate coupling portion including an axially extending portion extending through said recess, a circumferential length of said axially extending portion being shorter than a corresponding circumferential length of said recess, said plate coupling further including a claw which extends radially inwardly and connects to the other of said first rotary circular plates, and wherein said plate coupling portion is configured to engage circumferential ends of said recesses in response to relative rotation between said second circular plate and said paired first circular plates thus limiting relative rotation therebetween.

9. The damper disk assembly according to claim 8, further comprising first and second friction plates, said first friction plate disposed between one of said first annular plates and said second annular plate, said second friction plate disposed between the other of said first annular plates and said second annular plate, said first and second friction plates for generating friction in response to relative rotation between said first annular plates and said second annular plate.

10. The damper disk assembly according to claim 8, wherein said claw is fixed to said other of said first annular plates by a rivet which extends through said other of said first annular plates and said claw.

11. The damper disk assembly according to claim 8, wherein said claw is formed with a projection which extends through an aperture formed in said other of said first annular plates.

12. The damper disk assembly according to claim 8, further comprising a cushion plate having a plurality of friction surfaces fixed thereto, said cushion plate being fixed to said claw and said other of said first annular plates.

13. The damper disk assembly according to claim 8, wherein said one of said first annular plates further comprises a radial outward portion having friction surface members attached thereto radially outward from axially extending portion.

14. The damper disk assembly according to claim 8, further comprising a hub disposed radially inward from said second annular plate, said hub and said second annular plate being configured for limited rotary displacement with respect to one another.

15. The damper disk assembly according to claim 14, further comprising first, second and third friction plates, said first friction plate disposed between one of said first annular plates and said second annular plate, said second friction plate disposed between the other of said first annular plates and said second annular plate, and said third friction plate disposed between said other of said first annular plates and said hub, said first and second friction plates for generating friction in response to relative rotation between said first annular plates and said second annular plate, and said third friction plate for generating friction in response to relative rotation between said first annular plates and said hub.

* * * * *